United States Patent Office 3,465,049
Patented Sept. 2, 1969

3,465,049
PRODUCTION OF PHENOLS
William H. Starnes, Jr., Baytown, Tex., assignor to Esso Research and Engineering Company
No Drawing. Filed Oct. 22, 1965, Ser. No. 502,538
Int. Cl. C07c 37/00, 39/26
U.S. Cl. 260—623       10 Claims

ABSTRACT OF THE DISCLOSURE

Hindered ortho-chlorophenol is prepared by treating an aromatic hydrocarbon solution of a selected dienone with hydrogen chloride when the dienone is peroxy dienone and with a halogen acid catalyst when the dienone is chlorodienone at a suitable reaction temperature in the absence of light to form a product containing the hindered ortho-chlorophenol from which the hindered ortho-chlorophenol is recovered.

---

The present invention is directed to hindered phenol. More particularly, the present invention is concerned with hindered ortho-chlorophenol. In its more specific aspects the invention is concerned with t-alkyl hindered ortho chlorophenol and method for preparing same.

The present invention may be described as hindered ortho-chlorophenol having the following structural formula:

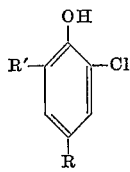

where R is a primary alkyl radical having one to ten carbon atoms in the alkyl group such as, but not limited to, methyl, ethyl, propyl, butyl, pentyl, hexyl, and the like; and where R' is a primary, secondary, or t-alkyl radical having one to twenty carbon atoms in the alkyl group. For example, R' may be a t-butyl, t-pentyl, t-hexyl and the like alkyl groups, but may be other groups.

In the practice of the present invention of the method of preparing the hindered ortho-chlorophenol, the feed stock is an aromatic hydrocarbon solution of a suitably-substituted dienone such as, but not limited to, 2-t-alkyl-4 - prim. - alkyl - 6 - alkyl - 4 - alkylperoxycyclohexa-2,5 - dien - 1 - one or 2 - t - alkyl - 4 - prim. - alkyl-6 - alkyl - 4 - chlorocyclohexa - 2,5 - dien - 1-one. If the 6-alkyl radical in the dienone is not tertiary, the product will be

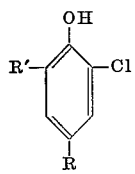

with R' not tertiary. The peroxydienonoe is treated with gaseous hydrogen chloride at a temperature within the range from about 15° C. to about 90° C. to obtain a product in excellent yield after the mixture has been allowed to stand under nitrogen in the absence of light for about 10 to about 48 hours. The substituted peroxydienone is easily prepared in high yield by reaction of a hydroperoxide with a trialkylphenol in the presence of a transition metal catalyst. The compound of the present invention as illustrated by 2 - chloro - 6 - t-butyl-p-cresol is prepared in accordance with the following equation:

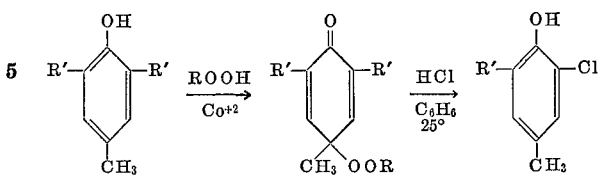

In the foregoing equation, R' is a t group having four to twenty carbon atoms. In the particular example, R' is a t-butyl group. Illustrative of the transition metal catalysts are: cobalt naphthenate, cobalt stearate, manganesse naphthenate, manganese stearate, ferrous naphthenate, and ferrous stearate. In the reaction indicated by the equation immediately above, the phenol was 2,6-di-t-butyl p-cresol and the transition metal catalyst was cobalt naphthenate.

The compounds of the present invention are useful as antioxidants in gasoline, heating oil, polyolefins, lubricating oils and the like, and also are useful as antiseptics and disinfectants.

The invention will be further illustrated by the following examples in which the best mode contemplated is set forth:

Example I

A solution of 2 - t - butyl - 4 - methyl - 6 - t - butyl-4 - t - butylperoxycyclohexa - 2,5 - dien - 1 - one in an amount of 1.54 parts in anhydrous benzene of 65 volumes was saturated with gaseous hydrogen chloride and the solution was held under nitrogen and allowed to stand in the dark for two days. The resulting mixture containing the reaction product was then washed in succession with 30 volumes of water, two 20-volume portions of 1 N sodium carbonate solution and 25 volumes of saturated aqueous sodium chloride. After separation from the several treating reagents, the solution was contacted with an adsorbent, such as Drierite, to remove water and the solvent was evaporated from the reaction product under reduced pressure of 5–10 mm. to obtain one part of an oily phase which was then submitted for analysis and found to contain over 90% of 2 - chloro-6-t-butyl-p-cresol. The pure material was separated by gas chromatography and rigorously identified by mass spectral, infrared, and NMR measurements. Analysis was as follows:

Calculated for $C_{11}H_{15}ClO$: C, 66.49%; H, 7.61%; Cl, 17.84%. Found: C, 66.39%; H, 7.48%; Cl, 17.70%.

In an alternative to Example I, the hindered ortho-chlorophenol is prepared from 2 - t - alkyl - 4 - prim.-alkyl - 6 - alkyl - 4 - chlorocyclohexa - 2,5 - dien - 1-one. The dienone is readily prepared by treatment of the corresponding trialkyl phenol with molecular chlorine in a suitable solvent or solvent mixture. In accordance with the present invention, the dienone is converted in excellent yields by treatment with hydrogen chloride, which also acts as a catalyst for the reaction. As illustrative of this embodiment of the present invention, the following equation illustrates the reaction:

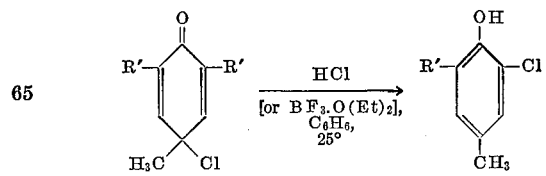

where R' is a primary secondary or t-alkyl rtdical having one to twenty carbon atoms in the alkyl group. Where R' is a tertiary radical, both R' groups must be identical.

Example II 2,6-di-t-butyl-4-methyl - 4 - chlorocyclohexa-2,5-dien-1-one in an amount of 1.27 parts dissolved in 65 volumes of an hydrous benzene and as a stirred solution was bubbled with gaseous hydrogen chloride for five minutes and then sealed under nitrogen and allowed to stand in the dark for approximately 17 hours. After evaporation of volatile constituents under reduced pressure of 5–10 mm. at a room temperature of 25° C., a residue of almost quantitative yield of the 2-chloro-6-t-butyl-p-cresol was obtained.

Example III

A solution of the same dienone of Example II in the same amount and the same solution was stirred under nitrogen while .75 volume of boron trifluoride etherate was added drop-wise during two minutes. The mixture was sealed under nitrogen and was allowed to stand 18.5 hours, after which it was washed with 3 N sodium carbonate solution in two 30-volume portions. After separation of the oily phase, the organic moiety was treated with an adsorbent, such as Drierite, followed by removal of the benzene solvent under reduced pressure of 5–10 mm. An almost quantitative yield of the 2-chloro-6-t-butyl-p-cresol was obtained.

While the invention has been illustrated by the use of benzene as an aromatic hydrocarbon solvent, it is to be understood that other hydrocarbons such as, but not limited to toluene, xylene, tri-methyl and tetra-methyl benzenes, and the like, may be used.

Mixtures of these aromatic hydrocarbons may also be employed, or an aromatic hydrocarbon fraction containing one or more of several aromatics boiling within the range of from 160° F. to about 400° F. may be used in lieu of the purified aromatic hydrocarbon.

In preparing the hindered ortho-chlorophenol of the present invention, as shown by the foregoing examples, one may start with either the peroxydienone or the chlorodienone. In the foregoing structural formulas of the starting materials:

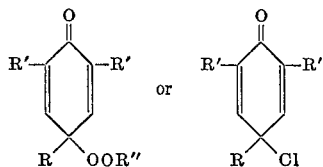

R' must be identical tertiary groups; whereas, R'' is also tertiary but not necessarily identical to R'.

While hydrogen chloride and boron trifluoride etherate have been illustrated as suitable acid catalysts, other catalysts may be used such as, but not limited to, boron trifluoride (gas), stannic chloride, and zinc chloride. When the starting material is the peroxydienone, the catalyst is hydrogen chloride. Hydrogen chloride and the other catalysts are effective with the chloridienone.

The nature and objects of the present invention having been completely described and illustrated and a best mode contemplated set forth, what I wish to claim as new and useful and secure by Letters Patent is:

1. A method for preparing a hindered ortho-chlorophenol which comprises:

treating an aromatic hydrocarbon solution of a dienone selected from the group consisting of the peroxy and chlorodienones having the following structural formulas:

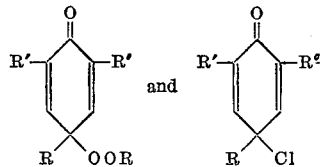

where R is a primary alkyl radical having one to ten carbon atoms and R' is an alkyl radical selected from the primary, secondary and t-alkyl radicals having one to twenty carbon atoms;

with gaseous hydrogen chloride at a reaction temperature within the range of 15° to 90° C. in the absence of light to form a product containing hindered ortho-chlorophenol; and recovering said hindered ortho-chlorophenol from said product.

2. A method for preparing a hindered ortho-chlorophenol which comprises:

treating an aromatic hydrocarbon solution of 2-t-alkyl-4-prim.-alkyl-6-t-alkyl - 4 - chlorocyclohexa - 2,5-dien-1-one;

with a treating reagent selected from the group consisting of hydrogen chloride, borone trifluoride etherate, gaseous boron trifluoride, stannic chloride, and zinc chloride at a reaction temperature within the range of 15° to 90° C. in the absence of light to form a product containing hindered ortho-chlorophenol; and recovering said hindered ortho-chlorophenol.

3. A method for preparing a hindered ortho-chlorophenol which comprises:

treating an aromatic hydrocarbon solution of a dienone having the following structural formula:

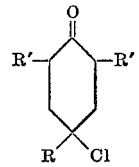

where R is a primary alkyl radical having one to ten carbon atoms and R' is an alkyl radical selected from the primary, secondary and t-alkyl radicals having one to twenty carbon atoms;

with a treating reagent selected from the group consisting of hydrogen chloride, boron trifluoride etherate, gasous boron trifluoride, stannic chloride, and zinc chloride at a reaction temperature within the range of 15° to 90° C. in the absence of light to form a product containing hindered ortho-chlorophenol; and recovering said hindered ortho-chlorophenol from said product.

4. A method in accordance with claim 1 in which the dienone is 2-t-butyl-4-methyl-6-t-butyl-4-t-butylperoxycyclohexa-2,5-dien-1-one.

5. A method in accordance with claim 1 in which the dienone is 4-chlorocyclohexa-2,5-dien-1-one containing a methyl group in the 4-position and a t-butyl group in the 2- and 6- positions.

6. A method in accordance with claim 1 in which the aromatic hydrocarbon is benzene.

7. A method in accordance with claim 2 in which the dienone is 2,6-di-t-butyl-4-chlorocyclohexa-2,5-dien-1-one and the catalyst is boron trifluoride etherate.

8. A method in accordance with claim 1 in which the reaction temperature is 25° C.

9. A method in accordance with claim 1 in which the primary alkyl radical has 1 to 10 carbon atoms and the t-alkyl radical has 4 to 20 carbon atoms.

10. A method for preparing a hindered ortho-chlorophenol which comprises:

treating an aromatic hydrocarbon solution of a dienone selected from the group consisting of 2-t-alkyl-4-prim.-alkyl-6-t-alkyl - 4 - alkylperoxycyclohexa-2,5-dien-1-one and 2-t-alkyl-4-prim.-alkyl-6-t-alkyl-4-chlorocyclohexa-2,5-dien-1-one;

with gaseous hydrogen chloride at a reaction temperature within the range of 15° C. to 90° C. in the absence of light to form a product containing hindered ortho-chlorophenol; and
recovering said hindered ortho-chlorophenol from said product.

References Cited

UNITED STATES PATENTS 2,560,044  6/1957  Albert _____ 260—623

LEON ZITVER, Primary Examiner
W. B. LONE, Assistant Examiner